(12) United States Patent
Kato et al.

(10) Patent No.: US 9,193,245 B2
(45) Date of Patent: Nov. 24, 2015

(54) VEHICULAR AIR CONDITIONING CONTROL DEVICE, VEHICULAR AIR CONDITIONING CONTROL METHOD, VEHICULAR AIR CONDITIONING CONTROL PROGRAM, AND RECORDING MEDIUM

(75) Inventors: Yasushi Kato, Toyota (JP); Masahiro Shoji, Okazaki (JP); Shigeki Ito, Okazaki (JP)

(73) Assignees: TOYOTA JIDOSHA KABUSHIKI KAISHA, Toyota (JP); DENSO CORPORATION, Kariya-shi (JP)

( * ) Notice: Subject to any disclaimer, the term of this patent is extended or adjusted under 35 U.S.C. 154(b) by 103 days.

(21) Appl. No.: 14/118,680

(22) PCT Filed: May 21, 2012

(86) PCT No.: PCT/JP2012/062967
§ 371 (c)(1),
(2), (4) Date: Nov. 19, 2013

(87) PCT Pub. No.: WO2012/161166
PCT Pub. Date: Nov. 29, 2012

(65) Prior Publication Data
US 2014/0116076 A1    May 1, 2014

(30) Foreign Application Priority Data

May 23, 2011    (JP) .................................. 2011-114982

(51) Int. Cl.
*B60H 1/00*    (2006.01)
*B60H 3/00*    (2006.01)
*B60H 1/32*    (2006.01)

(52) U.S. Cl.
CPC ............ *B60H 1/00642* (2013.01); *B60H 1/322* (2013.01); *B60H 1/3205* (2013.01); *B60H 3/0085* (2013.01); *B60H 2001/3258* (2013.01); *B60H 2001/3261* (2013.01); *B60H 2001/3266* (2013.01); *B60H 2001/3282* (2013.01)

(58) Field of Classification Search
CPC ................... B60H 1/00642; B60H 2001/3258; B60H 1/00007; B60H 1/3205
USPC .......................................................... 62/186
See application file for complete search history.

(56) References Cited

U.S. PATENT DOCUMENTS 4,094,166 A * 6/1978 Jerles ............................... 62/158
4,274,475 A * 6/1981 Rall et al. ....................... 165/211
5,271,236 A * 12/1993 Sweetser .......................... 62/155
5,546,754 A    8/1996 Terao et al.

(Continued)

FOREIGN PATENT DOCUMENTS

JP    A-60-113040    6/1985
JP    A-7-156646    6/1995

(Continued)

*Primary Examiner* — Ljiljana Ciric
*Assistant Examiner* — Alexis Cox
(74) *Attorney, Agent, or Firm* — Oliff PLC

(57) ABSTRACT

A vehicular air conditioning control device that detects an outside air temperature, and calculates the time for the evaporator blower to continue to blow after the engine has been shut off, in an air conditioning system where the compressor is powered by the engine. After a given elapsed time, the control device restarts the blower fan, issues an engine startup request, and initiates refrigerant circulation by the compressor.

9 Claims, 7 Drawing Sheets

(56) References Cited

U.S. PATENT DOCUMENTS

| | | | |
|---|---|---|---|
| 5,699,960 A * | 12/1997 | Kato et al. | 237/2 A |
| 5,884,839 A * | 3/1999 | Aoki et al. | 237/12.3 R |
| 5,931,011 A * | 8/1999 | Shima et al. | 62/182 |
| 5,983,649 A * | 11/1999 | Aislabie et al. | 62/133 |
| 6,622,926 B1 * | 9/2003 | Sartain et al. | 236/46 R |
| 2001/0027657 A1 * | 10/2001 | Yamasaki et al. | 62/222 |
| 2002/0023448 A1 * | 2/2002 | Ito et al. | 62/222 |
| 2003/0131623 A1 * | 7/2003 | Suppes | 62/324.1 |
| 2004/0098992 A1 * | 5/2004 | Lee et al. | 62/157 |
| 2005/0005621 A1 * | 1/2005 | Jayadev | 62/230 |
| 2005/0132730 A1 * | 6/2005 | Lim et al. | 62/157 |
| 2005/0235833 A1 * | 10/2005 | Sassa et al. | 96/417 |
| 2015/0027151 A1 * | 1/2015 | Cur et al. | 62/117 |

FOREIGN PATENT DOCUMENTS

| | | |
|---|---|---|
| JP | A-2000-104584 | 4/2000 |
| JP | A-2001-130247 | 5/2001 |
| JP | A-2002-192933 | 7/2002 |
| JP | A-2002-301922 | 10/2002 |
| JP | A-2006-224745 | 8/2006 |

* cited by examiner

- 10  VEHICULAR AIR CONDITIONING SYSTEM
- 11  AIR CONDITIONING ECU
- 12  ENGINE ECU
- 14  COMPRESSOR
- 16  CONDENSER
- 17  ECO-RUNNING ECU
- 18  EXPANSION VALVE
- 20  EVAPORATOR
- 29  MEMORY
- 30  INSIDE AIR TEMPERATURE SENSOR
- 32  OUTSIDE AIR TEMPERATURE SENSOR

VEHICULAR AIR CONDITIONING CONTROL DEVICE, VEHICULAR AIR CONDITIONING CONTROL METHOD, VEHICULAR AIR CONDITIONING CONTROL PROGRAM, AND RECORDING MEDIUM

TECHNICAL FIELD

The present invention pertains to a vehicular air conditioning control device, a vehicular air conditioning control method, a vehicular air conditioning control program, and a recording medium, and particularly relates to a vehicular air conditioning control device, a vehicular air conditioning control method, a vehicular air conditioning control program, and a recording medium that control a vehicular air conditioning system installed in a vehicle such as a hybrid vehicle that runs on a motor or an automobile whose engine shuts down when the automobile makes a stop.

BACKGROUND ART

Technologies which, when a vehicle makes a stop, shut down the engine of the vehicle in order to control unnecessary exhaust gas emissions and fuel consumption caused by idling are known.

In such technologies, when the engine is shut down when the compressor and the blower fan are on in order to air-condition (e.g., cool) the cabin, the compressor, which is driven by the engine, is switched off so that air conditioning refrigerant compression and circulation is no longer performed. When air conditioning refrigerant compression and circulation is no longer performed, odor occurs and fogging of the windshield glass and so forth occurs because of the evaporation of liquid from the surface of the evaporator and the blowing out of damp air from the surface of the evaporator.

Patent citation 1 proposes a technology that suppresses unpleasant odor by monitoring the temperature at which condensate on the evaporator dries during engine shutdown and starting up the engine to thereby cause the compressor to operate before the condensate dries. Specifically, in the process of the evaporator outlet temperature increasing to the high temperature side at the time when the compressor is shut down, the technology determines a temporary drop in the evaporator outlet temperature, which arises just before the condensate on the surface of the evaporator completely dries, and restarts the compressor.

Patent Literature

Patent Citation 1: Japanese Patent Application Laid-Open (JP-A) No. 2001-130247

SUMMARY OF INVENTION

However, in the technology described in patent citation 1, if air blowing resulting from the operation of the blower fan is continued, the condensate on the surface of the evaporator dries at an earlier time compared to a case where the blower fan is not operating. For this reason, even if the engine is shut down when the vehicle is making a stop, there are cases where it is necessary to shorten the engine shutdown time and restart the compressor at an earlier time.

The present invention has been made in consideration of the above circumstances, and it is an object thereof to provide a vehicular air conditioning control device, a vehicular air conditioning control method, a vehicular air conditioning control program, and a recording medium that can save power while improving the cabin environment with a simple configuration.

In order to achieve the above object, a vehicular air conditioning control device of the present invention comprises: an acquiring component that acquires a detection result of a detecting component that detects an outside air temperature; a calculating component that calculates, from the acquisition result of the acquiring component as a predetermined time corresponding to the outside air temperature which becomes longer as the outside air temperature becomes higher, a blower fan operating time lasting from engine shutdown until blower fan shutdown when a cabin is being air-conditioned by an air conditioning component equipped with an evaporator, a blower fan that blows air in the direction of the evaporator, and a compressor that operates using an engine as a drive source and compresses refrigerant; and a control component that controls the blower fan in such a way that the blower fan shuts down when the blower fan operating time calculated by the calculating component has elapsed after the engine has been shut down by an engine control component that controls engine startup and shutdown in accordance with the driving state of the vehicle when the cabin is being air-conditioned by the air conditioning component.

According to the present invention, the acquiring component acquires the outside air temperature detected by the detecting component, and the air conditioning component is equipped with the compressor, which operates using the engine as a drive source, and air-conditions the cabin using the refrigerant compressed by the compressor.

The calculating component calculates, from the acquisition result of the acquiring component as the predetermined time corresponding to the outside air temperature which becomes longer as the outside air temperature becomes higher, the blower fan operating time lasting from engine shutdown until blower fan shutdown when the cabin is being air-conditioned by the air conditioning component. For example, the calculating component can calculate the blower fan operating time from the outside air temperature using a predetermined function in which the outside air temperature is the variable. As the predetermined time corresponding to the outside air temperature, a time shorter than the time until the occurrence of odor and the occurrence of glass fogging caused by the evaporation of liquid around the evaporator arise is predetermined in correspondence to the outside air temperature. Further, the calculating component may be configured to calculate the blower fan shutdown time from a predetermined map in accordance with the outside air temperature. Thus, the blower fan operating time can be easily calculated.

Further, the engine control component controls engine startup and shutdown in accordance with the driving state of the vehicle. The engine control component performs control such as, for example, shutting down the engine in a case where the vehicle has made a stop and a parking brake or the like has been operated and automatically starting up the engine in a case where the parking brake has been released thereafter.

The control component controls the blower fan in such a way that the blower fan shuts down in a case where the blower fan operating time calculated by the calculating component has elapsed when the engine has been shut down by the engine control component and the operation of the blower fan is being continued when the cabin is being air-conditioned.

In this way, the vehicular air conditioning control device calculates, from the outside air temperature detection result, the blower fan operating time until odor and glass fogging occur and controls the blower fan in such a way that the blower fan shuts down in a case where the blower fan operating time has elapsed, so the early evaporation of liquid around the evaporator can be prevented and odor and glass fogging no longer occur. That is, the cabin environment is improved by operating the blower fan for the predetermined time from engine shutdown, and the engine shutdown time from engine shutdown to engine startup can be extended as a result of the blower fan being shut down after the predetermined time. Thus, engine startup and shutdown can be controlled in such a way as to save power while improving the cabin environment, that is, in such a way as to extend the engine shutdown time.

In the vehicular air conditioning control device, the control component can control the operation of the blower fan in such a way that the blowing force of the blower fan is suppressed in the blower fan operating time lasting from engine shutdown until blower fan shutdown.

Shutting down the blower fan after the predetermined time when the operation of the blower fan is being continued can prevent the early evaporation of liquid around the evaporator. The time when the blower fan is operating until this shutdown corresponds to an extension of the time when the cabin is being air-conditioned by the air conditioning component, and the comfort of the cabin is ensured. However, because the blower fan is operating in the same state as it does when the cabin is being air-conditioned by the air conditioning component using the working of the compressor, the time until liquid around the evaporator evaporates is shortened. Therefore, by controlling the operation of the blower fan in such a way that the blowing force of the blower fan is suppressed in the blower fan operating time, such as, for example, turning down the blower, the engine shutdown time can be extended while improving the cabin environment.

In the vehicular air conditioning control device, the control component can obtain a sensing result of sensing component that senses the temperature of the evaporator, and the control component can control the blower fan in such a way that the blower fan operates until a time when the sensing result reaches a dew point temperature corresponding to the outside air temperature.

The temperature of the evaporator is considered to be the factor why the occurrence of odor and the occurrence of glass fogging caused by the evaporation of liquid around the evaporator arise. Therefore, by obtaining the sensing result of the sensing component that senses the temperature of the evaporator and controlling the blower fan in such a way that the blower fan operates until the time when the sensing result reaches the dew point temperature corresponding to the outside air temperature, the optimum time at which to shut down the blower fan can be found from the temperature relationship resulting from odor and glass fogging. For this reason, the engine shutdown time can be extended while improving the cabin environment in accordance with the current environment.

The temperature of the evaporator may be measured directly or may be estimated by calculation. For example, in a case where the temperature of the evaporator is estimated, the temperature of the evaporator can be calculated from a rate of temperature increase or a temperature characteristic found beforehand on the basis of the outside air temperature and the blower fan operating time. Further, the blower fan operating time can be calculated from the acquisition result of the acquiring component in such a way that it becomes a time shorter by a predetermined time than an engine shutdown time lasting from engine shutdown until the temperature around the evaporator reaches the dew point temperature (e.g., until glass fogging occurs). That is, the engine shutdown time lasting from engine shutdown until the temperature around the evaporator reaches the dew point temperature fluctuates depending on the outside air temperature. Therefore, by shutting down the blower fan at a time that becomes shorter by a time that is shorter by a predetermined time than the engine shutdown time, the blower fan can be stably shut down in accordance with the outside air temperature, and the engine shutdown time can be extended while improving the cabin environment in accordance with the outside air temperature.

In the vehicular air conditioning control device, the control component can control the blower fan in such a way that the blower fan shuts down when the outside air temperature is in a predetermined outside air temperature range.

There are cases where simply shutting down the blower fan in order to prevent the evaporation of liquid around the evaporator has an effect on the comfort of the cabin. For example, a temperature range that has little effect on the comfort of the cabin in a case where the blower fan has been shut down can be experientially obtained or experimentally found. Therefore, by configuring the control component to control the blower fan in such a way that the blower fan shuts down when the outside air temperature is in the predetermined outside air temperature range, the effect on the comfort of the cabin can be controlled.

The vehicular air conditioning control device may be configured in such a way that the calculating component calculates the engine shutdown time lasting from engine shutdown until the temperature around the evaporator reaches the dew point temperature (e.g., until odor and glass fogging occur) on the basis of the outside air temperature and the blower fan operating time and the control component controls the engine control component in such a way as to start up the engine in a case where the engine shutdown time calculated by the calculating component has elapsed. By configuring the vehicular air conditioning control device in this way, the calculating component calculates the engine shutdown time until odor and glass fogging occur from the outside air temperature detection result and the control component controls the engine control component in such a way as to start up the engine in a case where the engine shutdown time has elapsed, so odor and glass fogging no longer occur. That is, engine startup and shutdown can be controlled while improving the cabin environment with the simple configuration of just detecting the outside air temperature.

A vehicular air conditioning control method of the present invention comprises: an acquisition step of acquiring a detection result of a detecting component that detects an outside air temperature; a calculation step of calculating, from the acquisition result of the acquiring component as a predetermined time corresponding to the outside air temperature which becomes longer as the outside air temperature becomes higher, a blower fan operating time lasting from engine shutdown until blower fan shutdown when a cabin is being air-conditioned by an air conditioning component equipped with an evaporator, a blower fan that blows air in the direction of the evaporator, and a compressor that operates using an engine as a drive source and compresses refrigerant; and a control step of controlling the blower fan in such a way that the blower fan shuts down when the blower fan operating time calculated by the calculating component has elapsed after the engine has been shut down by an engine control component that controls engine startup and shutdown in accordance with the driving state of the vehicle when the cabin is being air-conditioned by the air conditioning component.

According to the vehicular air conditioning control method of the present invention, the vehicular air conditioning control method calculates, from the outside air temperature detection result, the blower fan operating time until odor and glass fogging occur and controls the blower fan in such a way that the blower fan shuts down in a case where the blower fan operating time has elapsed, so the early evaporation of liquid around the evaporator can be prevented and odor and glass fogging no longer occur. That is, the cabin environment is improved by operating the blower fan for the predetermined time from engine shutdown, and the engine shutdown time from engine shutdown to engine startup can be extended as a result of the blower fan being shut down after the predetermined time. Thus, engine startup and shutdown can be controlled in such a way as to save power while improving the cabin environment, that is, in such a way as to extend the engine shutdown time.

A vehicular air conditioning control program of the present invention causes a computer to function as each of the components of the vehicular air conditioning control device. The vehicular air conditioning control program may be stored in a recording medium so as to be distributable.

As described above, according to the present invention, the invention calculates, from the outside air temperature detection result, the blower fan operating time until odor and glass fogging occur and controls the blower fan in such a way that the blower fan shuts down in a case where the blower fan operating time has elapsed, so the invention has the effects that it can prevent the early evaporation of liquid around the evaporator and can save power while improving the cabin environment.

DESCRIPTION OF EMBODIMENTS

Examples of embodiments of the present invention will be described in detail below with reference to the drawings. In these embodiments, the present invention is applied to a vehicular air conditioning system installed in a vehicle that runs on the power of an engine such as an internal combustion engine or a hybrid vehicle that is equipped with an engine and a motor.

First Embodiment

Figure 1:
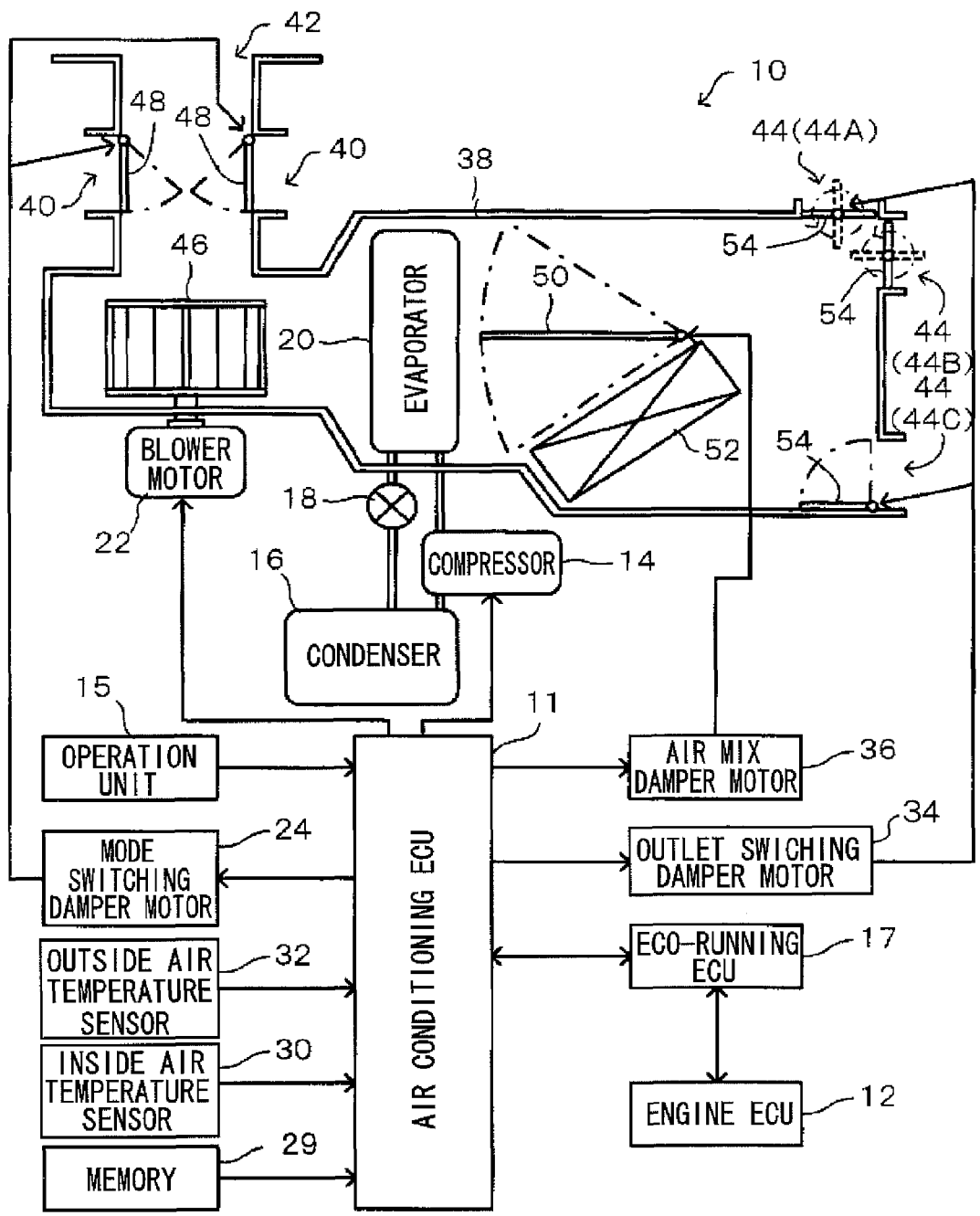
FIG. 1 is a block diagram showing the schematic configuration of a vehicular air conditioning system pertaining to a first embodiment of the present invention.

FIG. 1 is a block diagram showing the schematic configuration of a vehicular air conditioning system 10 pertaining to a first embodiment of the present invention. This embodiment controls the driving of a blower fan that blows air in the direction of an evaporator during so-called eco-running in which an engine shutdown request is issued and the engine is shut down in order to save power while improving the cabin environment when the cabin is being air-conditioned.

In the vehicular air conditioning system 10, a refrigeration cycle is configured by a refrigerant circulation path that includes a compressor 14, a condenser 16, an expansion valve 18, and an evaporator 20. The evaporator 20 cools air passing through the evaporator 20 (hereinafter this air will be called post-evaporator air) by vaporizing refrigerant that has been compressed and liquefied. At this time, the evaporator 20 causes moisture in the air to condense by cooling the air passing through the evaporator 20; thus, the post-evaporator-20 air is dehumidified. The expansion valve 18, which is disposed on the upstream side of the evaporator 20, rapidly reduces the pressure of the liquefied refrigerant to thereby turn the refrigerant into a mist and supply the refrigerant to the evaporator; thus, the expansion valve 18 improves the efficiency with which the refrigerant is vaporized in the evaporator 20.

In the present embodiment, the compressor 14 of the vehicular air conditioning system 10 compresses the refrigerant and causes the refrigerant cycle to circulate with a compressor that is mechanically driven using the power of the vehicle.

The evaporator 20 of the vehicular air conditioning system 10 is disposed in an air conditioning duct 38. The air conditioning duct 38 is open at both ends, and air inlets 40 and 42 are formed in one of the open ends. Further, plural air outlets 44 (in the present embodiment, 44A, 44B, and 44C are shown as an example) that open to the cabin are formed in the other of the open ends. The air inlets 42 are communicated with the outside of the vehicle and can introduce outside air into the air conditioning duct 38. Further, the air inlets 40 are communicated with the inside of the vehicle and can introduce air inside the cabin (inside air) into the air conditioning duct 38. The air outlets 44 include, as an example, defroster outlets 44A that blow out air in the direction of the windshield glass, side and center register outlets 44B, and floor outlets 44C.

A blower fan 46 is disposed in the air conditioning duct 38 between the evaporator 20 and the air inlets 40 and 42. Further, mode switching dampers 48 are disposed in the neighborhoods of the air inlets 40 and 42. The mode switching dampers 48 open and close the air inlets 40 and 42 by the operation of an actuator such as a mode switching damper motor 24.

The blower fan 46 is driven to rotate by a blower motor 22, sucks air through the air inlets 40 or the air inlets 42 and into the air conditioning duct 38, and sends the air to the evaporator 20. At this time, outside air or inside air is introduced into the air conditioning duct 38 depending on which of the air inlets 40 and 42 are open and which of the air inlets 40 and 42 are closed by the mode switching dampers 48. That is, the mode switching dampers 48 switch the air conditioning mode between an inside air recirculation mode and an outside air introduction mode.

An air mix damper 50 and a heater core 52 are disposed downstream of the evaporator 20. The air mix damper 50 is driven to turn by an air mix damper motor 36 and regulates the amount of post-evaporator-20 air passing through the heater core 52 and the amount of post-evaporator-20 air bypassing the heater core 52. Engine coolant circulates through the heater core 52, and the heater core 52 heats the air that has been guided thereto by the air mix damper 50.

The post-evaporator-20 air is guided to the heater core 50 in accordance with the opening degree of the air mix damper 50, is heated, becomes mixed with air that has not been heated by the heater core 52, and is thereafter sent to the air outlets 44. The vehicular air conditioning system 10 regulates the temperature of the air blown out through the air outlets 44 and into the cabin by controlling the air mix damper 50 to regulate the amount of air heated by the heater core 52.

Outlet switching dampers 54 are disposed in the neighborhoods of the air outlets 44 in correspondence to the air outlets 44. The vehicular air conditioning system 10 can blow out the temperature-regulated air into the cabin from desired positions by using these outlet switching dampers 54 to open and close the air outlets 44A, 44B, and 44C.

Further, the vehicular air conditioning system 10 is equipped with an air conditioning ECU (Electronic Control Unit) 11 for performing various types of control of the vehicular air conditioning system 10. The compressor 14, the blower motor 22, the mode switching damper motor 24, the air mix damper motor 36, an outlet switching damper motor 34, an outside air temperature sensor 32, and an inside air temperature sensor 30 are connected to the air conditioning ECU 11. Together with these, an operation unit 15 for performing various types of operations with respect to the vehicular air conditioning system 10, such as setting the temperature of the vehicular air conditioning system 10 and making outlet selections, is connected to the air conditioning ECU 11; the detection values of the outside air temperature sensor 32 and the inside air temperature sensor 30 are input to the air conditioning ECU 11, and the air conditioning ECU 11 is configured to perform air conditioning control of the cabin in accordance with the settings of the operation unit 15, for example, on the basis of the detection results of the sensors. An example of another sensor that can be connected to the air conditioning ECU 11 is a solar radiation sensor that detects weather conditions and so forth by detecting the amount of solar radiation to which the vehicle is exposed.

Moreover, an engine ECU 12 is connected to the air conditioning ECU 11 via an eco-running ECU (Electronic Control Unit) 17, and the air conditioning ECU 11 is configured in such a way that it can issue engine startup requests and shutdown requests to the engine ECU 12 via the eco-running ECU 17. In the present embodiment, the vehicular air conditioning system 10 is described as having a configuration equipped with the eco-running ECU 17, but the vehicular air conditioning system 10 may also be configured in such a way that the eco-running ECU 17 is omitted and the engine ECU is directly connected to the air conditioning ECU 11.

Moreover, a memory 29 is connected to the air conditioning ECU 11. The memory 29 is configured to store a map and a setting value whose details are described later. In the present embodiment, the vehicular air conditioning system 10 is described as having a configuration equipped with the memory 29, but the air conditioning ECU 11 may also be configured to have the same function as the memory 29.

The eco-running ECU 17 performs control that suppresses unnecessary exhaust gas and fuel consumption by issuing engine shutdown requests and engine startup requests to the engine ECU 12 in accordance with the running state of the vehicle. For example, the eco-running ECU 17 performs control such as stopping idling by issuing an engine shutdown request to the engine ECU 12 in a case where the vehicle has made a stop and a parking brake or the like has been operated and automatically starting up the engine by issuing an engine startup request to the engine ECU 12 in a case where the parking brake has been released thereafter. Further, in the present embodiment, the eco-running ECU 17 is configured to output to the engine ECU 12 requests such as engine shutdown requests and startup requests according to requests from the air conditioning ECU 11.

As an example of the various types of control that the air conditioning ECU 11 performs, for example, when the ignition switch is on, the air conditioning ECU 11 calculates a target outlet temperature on the basis of the detection results of the sensors and the settings of the operation unit 15 and performs air conditioning control in such a way that the outlet temperature becomes the target outlet temperature. Further, when the air conditioning ECU 11 preforms air conditioning control, the air conditioning ECU 11 also performs, in accordance with the target outlet temperature and so forth, control such as control for switching the compressor 14 on and off, control for driving the air mix damper motor 36, control for switching the air outlets 44, and control for switching the air inlets 40 and 42 (mode switching control for switching between the inside air recirculation mode and the outside air introduction mode).

The control for switching the air inlets 40 and 42 may also be performed manually by an occupant operating the operation unit 15.

Here, in the present embodiment, in order to suppress unnecessary exhaust gas and fuel consumption as described above, the eco-running ECU 17 performs engine shutdown and startup control. In this case, when an engine shutdown request is issued by the eco-running ECU 17 and the engine is shut down (hereinafter called eco-running) while the compressor 14 is on and the cabin is being air-conditioned, the refrigerant compression and circulation by the compressor 14 shuts down and the temperature of the evaporator 20 increases. Thus, sometimes odor occurs and glass fogging occurs as a result of liquid around the evaporator, such as, for example, liquid adhering to the surface of the evaporator, evaporating. As an example, sometimes, because of the evaporation of liquid adhering to the surface of the evaporator 20, air (smelly air) including smelly components included in that liquid is blown out through the air outlets 44 and odor occurs. Further, sometimes when the dew point temperature of the air blown out through the air outlets 44 exceeds the dew point temperature of the glass, glass fogging occurs.

Therefore, in the present embodiment, the air conditioning ECU 11 calculates, from the detection result of the outside air temperature sensor 32, a time shorter than the time until the occurrence of odor and the occurrence of glass fogging caused by the evaporation of liquid around the evaporator 20 arise, causes the operation of the blower fan 46 to continue until this predetermined time is reached, and, when this predetermined time elapses, shuts down the blower fan. Because of this shutdown of the blower fan 46, the early evaporation of liquid around the evaporator 20 can be prevented and odor and glass fogging no longer occur. Further, by causing the blower fan 46 to operate for the predetermined time from engine shutdown, air conditioning control is continued and the comfort of the cabin environment is improved. Moreover, the increase in the temperature around the evaporator 20 can be suppressed as a result of the blower fan 46 being shut down after the predetermined time. Thus, the time until the temperature of the evaporator reaches a temperature until the occurrence of odor and the occurrence of glass fogging caused by the evaporation of liquid around the evaporator 20 arise can be extended, and the engine shutdown time from engine shutdown to engine startup can be extended.

In the present embodiment, in order to prevent the occurrence of odor and the occurrence of glass fogging caused by the evaporation of liquid around the evaporator 20, the air conditioning ECU 11 shuts down the operation of the blower fan 46 between engine shutdown and engine startup.

Figure 2:
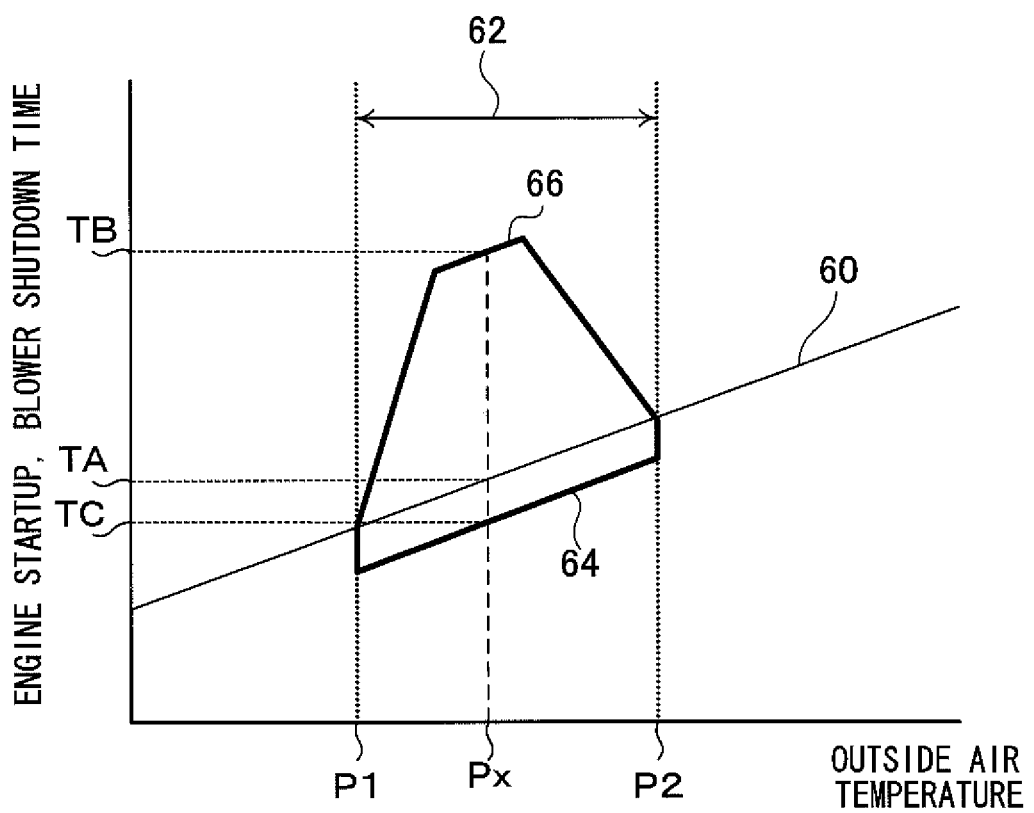
FIG. 2 is a characteristic map showing the correlation between time until engine startup during eco-running/blower fan operating time and outside air temperature.

On the basis of a characteristic map (hereinafter called an eco-running map) that is shown in FIG. 2, stored in the memory 29, and shows the correlation between the time until the engine is switched on (engine startup) during eco-running/the operating time of the blower fan 46 and the outside air temperature, the air conditioning ECU 11 sets, as a timer, a time in which eco-running is possible while causing the blower fan to operate for a predetermined time in accordance with the outside air temperature and issues an engine startup request after the elapse of the eco-runnable time.

First, a correlation characteristic 60, which uses the time from engine shutdown until odor and fogging occur when the operation of the blower fan 46 has been continued—that is, the time until the engine is switched on—as an eco-runnable time TA (an engine-on threshold value) and which is predetermined in such a way that time becomes longer as the outside air temperature becomes higher, is stored in the memory 29. This correlation characteristic 60 can be used to find the eco-runnable time TA (the engine-on threshold value) in accordance with the outside air temperature.

Here, in the present embodiment, in order to prevent the early occurrence of odor and glass fogging caused by the evaporation of liquid around the evaporator 20, the air conditioning ECU 11 shuts down the operation of the blower fan 46 between engine shutdown and engine startup. Such a shutdown of the operation of the blower fan 46 has an effect on the comfort of the cabin environment. In the present embodiment, because of the shutdown of the operation of the blower fan 46, an outside air temperature range that has little effect on the comfort of the cabin environment is found beforehand experimentally or experientially. Additionally, the outside air temperature range is set beforehand in such a way that the shutdown of the operation of the blower fan 46 is performed in the outside air temperature range that has little effect on the comfort of the cabin environment. That is, an outside air temperature range 62 (in FIG. 2, outside air temperatures P1 to P2) is stored in the memory 29 as a setting value with which control of the operation of the blower fan 46 (switching off the blower fan 46) is performed in the outside air temperature range that has little effect on the comfort of the cabin environment.

In consideration of the comfort of the cabin environment, which is dependent on air conditioning control, it is preferred that the air conditioning ECU 11 perform the control that switches off the blower fan 46 at an outside air temperature in the temperature range 62, but when the order of priority regarding the comfort of the cabin environment is low, the air conditioning ECU 11 may also perform the control that switches off the blower fan 46 at an outside air temperature outside the temperature range 62. This setting of the order of priority regarding the comfort of the cabin environment may be predetermined or may be set by an operation using the operation unit 15. Further, if the air conditioning ECU 11 is configured to perform the control that switches off the blower fan 46 at an outside air temperature outside the temperature range 62, it is preferred that the outside air temperature outside the temperature range 62 be settable in stages. For example, the outside air temperature may be set in fixed increments and decrements of a predetermined temperature away from an upper limit value and a lower limit value (in FIG. 2, the outside air temperatures P1 and P2) of the temperature range 62, so that the temperature range spreads in stages away from the temperature range 62. By setting the outside air temperature in this way, the extent of the effect on the comfort of the cabin environment can be set in stages.

The air conditioning ECU 11 controls the shutdown of the operation of the blower fan 46 in this outside air temperature range 62. For this reason, an off characteristic 64 that becomes shorter by a predetermined fixed time with respect to the correlation characteristic 60 is stored in the memory 29. As this off characteristic 64, the predetermined fixed time that becomes shorter with respect to the correlation characteristic 60 can be found beforehand experimentally or experientially with the purpose of balancing the comfort of the cabin environment and saving power. Consequently, a time TC at which to shut down the operation of the blower fan 46 in the outside air temperature range 62 can be found using the off characteristic 64 that becomes shorter by the predetermined fixed time from the eco-runnable time TA found in accordance with the outside air temperature.

Further, the air conditioning ECU 11 issues an engine startup request after the elapse of the eco-runnable time while causing the blower fan to operate for the predetermined time in accordance with the outside air temperature in the outside air temperature range 62. When the air conditioning ECU 11 shuts down the operation of the blower fan 46 in the outside air temperature range 62, the eco-runnable time is extended (see FIG. 3). Therefore, in the outside air temperature range 62, an engine-on characteristic 66, which is predetermined in such a way that the eco-runnable time TA (the engine-on threshold value) is extended in accordance with the time in which the operation of the blower fan 46 is continued, is stored in the memory 29. This engine-on characteristic 66 can be used to find an eco-runnable time TB extended in accordance with the outside air temperature.

Figure 3:
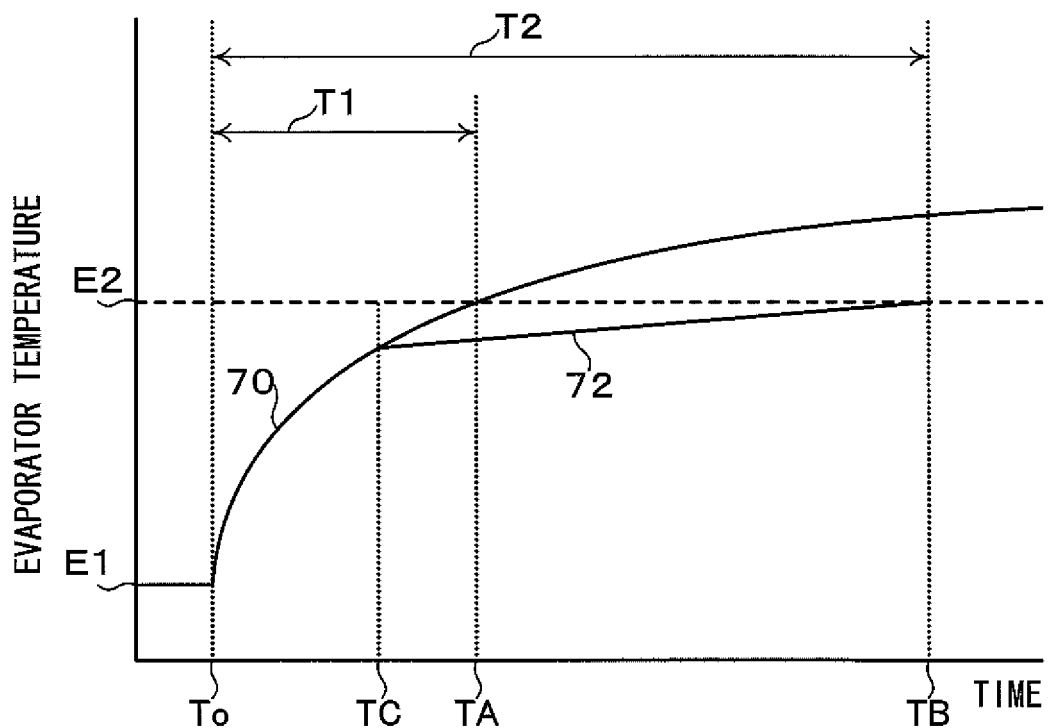
FIG. 3 is a diagram showing the temperature characteristic of an evaporator with respect to the elapse of time at an arbitrary outside air temperature.

FIG. 3 shows the temperature characteristic of the evaporator 20 with respect to the elapse of time at an arbitrary outside air temperature Px in the outside air temperature range 62. Until an engine shutdown time To, the temperature of the evaporator 20 stays at a temperature E1 because of air conditioning control. Thereafter, the temperature of the evaporator 20 becomes a characteristic 70 in which it gradually increases from the temperature E1 because of the engine shutdown. In this characteristic 70, at the time TA, the temperature of the evaporator 20 reaches a temperature E2 at which there is the potential for odor and glass fogging to occur because of the evaporation of liquid around the evaporator 20. Consequently, by switching on the engine at the time TA in order to suppress odor and glass fogging caused by the evaporation of liquid around the evaporator 20, the eco-runnable time becomes equal to T1.

In the present embodiment, the air conditioning ECU 11 shuts down the operation of the blower fan 46 at the time TC that is shorter by the predetermined fixed time from the eco-runnable time TA. Because of this shutdown of the operation of the blower fan 46, the increase in the temperature of the evaporator 20 is mitigated and the temperature of the evaporator 20 becomes a characteristic 72 that is a linear increase. Thus, the time until the engine is switched on—that is, the time until the temperature of the evaporator 20 reaches the temperature E2 at which there is the potential for odor and fogging to occur—is extended to a time TB. Consequently, the time until the engine is switched on is extended from the eco-runnable time T1 resulting from the continuation of the operation of the blower fan 46 to an eco-runnable time T2 resulting from the shutdown of the operation of the blower fan 46.

Figure 4:
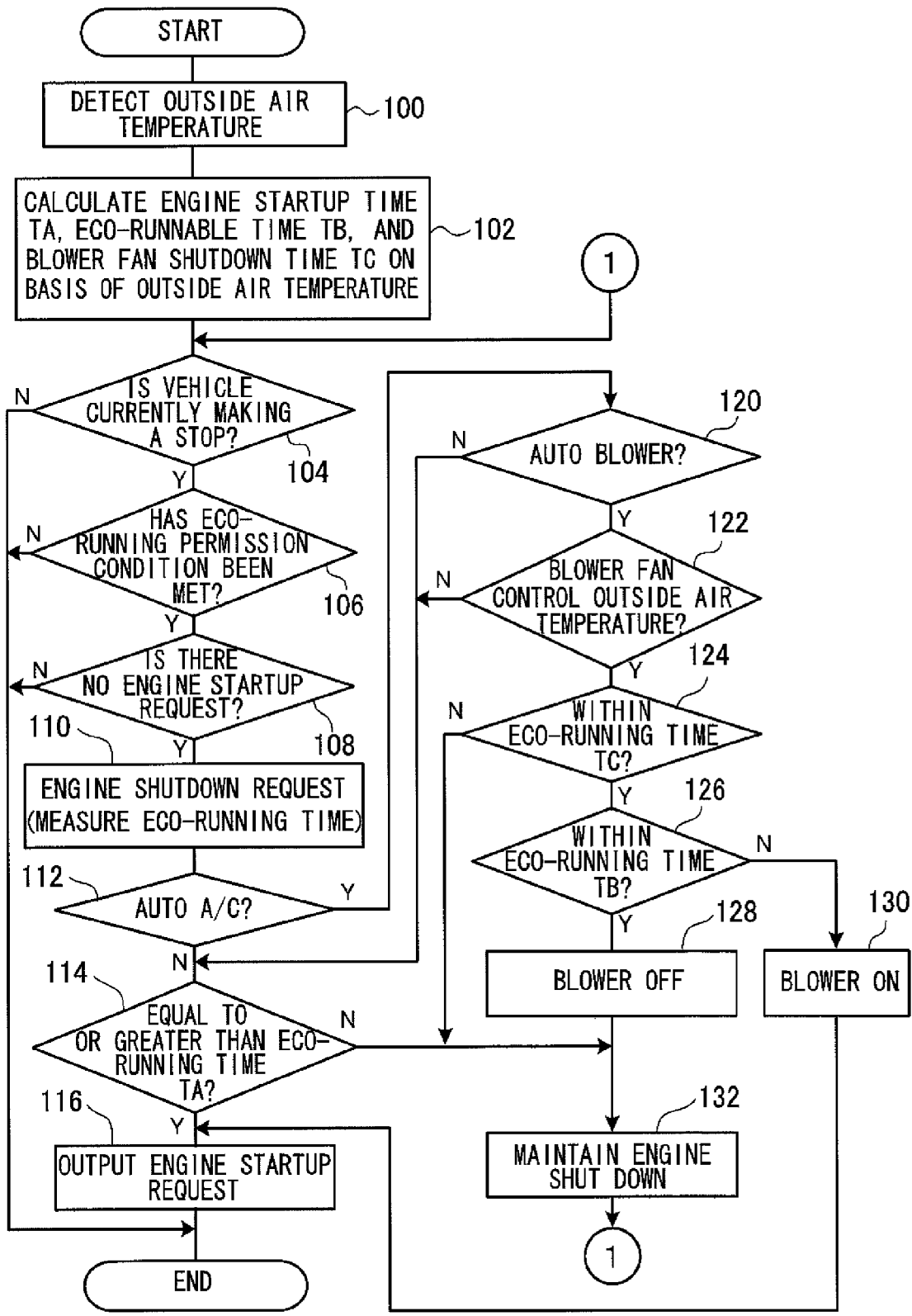
FIG. 4 is a flowchart showing an example of a flow of processing executed by an air conditioning ECU of the vehicular air conditioning system pertaining to the first embodiment of the present invention.

Next, processing performed by the air conditioning ECU 11 of the vehicular air conditioning system 10 pertaining to the present embodiment will be described. FIG. 4 is a flow-chart showing an example of a flow of processing relating to eco-running executed by the air conditioning ECU 11 of the vehicular air conditioning system 10 pertaining to the present embodiment.

First, when a non-illustrated ignition switch is switched on, the air conditioning ECU 11 initiates the processing, moves to step 100, and acquires the outside air temperature detection result from the outside air temperature sensor 32. In the next step 102, the air conditioning ECU 11 calculates the times TA, TB, and TC corresponding to the acquired outside air temperature using the eco-running map (FIG. 2) stored beforehand. First, for the time TA, the air conditioning ECU 11 calculates, from the outside air temperature, the time until the occurrence of odor and the occurrence of glass fogging caused by the evaporation of liquid around the evaporator 20 will arise, that is, the eco-runnable time when the operation of the blower fan has been continued (on) after engine shutdown. Further, for the time TC, the air conditioning ECU 11 calculates the time at which to shut down the operation of the blower fan 46 in the outside air temperature range 62. Moreover, for the time TB, the air conditioning ECU 11 calculates the extended eco-runnable time when the blower fan 46 has been shut down at the time TC in accordance with the outside air temperature.

Next, in step 104, it is determined whether or not the vehicle is currently making a stop. This determination is performed by judging, from the result of the air conditioning ECU 11 communicating with the eco-running ECU 17, whether or not the eco-running ECU 17 has received from the engine ECU 12 a signal indicating a vehicle stop. For example, it is judged that the vehicle is currently making a stop in a case where the vehicle has made a stop and the parking brake or the like has been operated or in a case where the vehicle speed according to the detection result of a vehicle speed sensor is "0". In a case where the determination is no, the air conditioning ECU 11 ends the processing because the processing relating to eco-running below is unnecessary (the air conditioning ECU 11 ends the processing and returns to step 100 or performs another form of processing). On the other hand, in a case where the determination is yes, the air conditioning ECU 11 moves to step 106 where it is determined whether or not an eco-running permission condition has been met. This determination is performed by judging, from the result of the air conditioning ECU 11 communicating with the eco-running ECU 17, whether or not the eco-running ECU 17 has received from the engine ECU 12 a signal indicating an eco-running permission condition. An example of the eco-running permission condition is a combined value resulting from the detection results of switches and so forth, such as a condition in which the brake is on and the clutch is off. In a case where the determination in step 106 is no, the air conditioning ECU 11 ends the processing, and in a case where the determination in step 106 is yes, the air conditioning ECU 11 moves to step 108.

In step 108, it is determined whether or not there is no engine startup request; in a case where the determination is no, the air conditioning ECU 11 ends the processing, and in a case where the determination is yes, the air conditioning ECU 11 moves to step 110. This determination is performed by judging, from the result of the air conditioning ECU 11 communicating with the eco-running ECU 17, whether or not the eco-running ECU 17 has transmitted to the engine ECU 12 a signal indicating an engine startup request or whether or not the eco-running ECU 17 has received an engine startup instruction that the engine ECU 12 has transmitted in accordance with the state of the battery, for example. This determination regarding the engine startup request includes a later-described case where the air conditioning ECU 11 outputs a signal indicating an engine startup request.

Next, in step 110, a signal indicating an engine shutdown request is output from the air conditioning ECU 11 to the eco-running ECU 17. Together with this, the timer for measuring the time (eco-running time) beginning from when the engine is shut down as a result of the air conditioning ECU 11 controlling the engine ECU 12 is activated. At the point in time of this step 110, the operation of the blower fan 46 is continued without being shut down.

In the next step 112, it is determined whether or not the vehicular air conditioning system 10 is set to an auto A/C mode. This determination is performed by judging, from the state of the operation unit 15, whether or not an auto A/C switch for switching on the compressor 12 is switched on. In a case where the determination is no, the air conditioning ECU 11 moves to step 114. In a case where the determination in step 112 is no, this corresponds to a state in which the occupant intentionally does not intend for the auto A/C mode to be on, so in order to maintain the engine shutdown without shutting down the blower fan, the air conditioning ECU 11 maintains the engine shutdown (step 132) and repeats the above processing until the timer reaches the eco-runnable time TA when the operation of the blower fan 46 has been continued (until the determination in step 114 becomes yes) which was found in accordance with the outside air temperature. In this step 114, it is determined whether or not the timer (the eco-running time) activated in step 110 has reached the time TA.

In the next step 116, a signal indicating an engine startup request is output to the eco-running ECU 17, and then the air conditioning ECU 11 ends the processing. In this step 116, the engine startup request is output to the eco-running ECU 17, and then the air conditioning ECU 11 ends the processing. That is, the air conditioning ECU 11 starts up the engine by outputting the engine startup request and initiates refrigerant circulation by the compressor 14, whereby odor and glass fogging can be suppressed.

In this way, when the occupant has intentionally not given an instruction that the auto A/C mode is to be on, engine startup is performed at the eco-runnable time TA. Thus, even in a case where the operation of the blower fan 46 has been continued by the intent of the occupant, the transition from engine shutdown to engine startup can be made by the time odor and glass fogging occur in accordance with the outside air temperature, and the occurrence of odor and glass fogging caused by the evaporation of the liquid around the evaporator 20 can be prevented.

On the other hand, in a case where the determination in step 112 is yes, the air conditioning ECU 11 moves to step 120. In step 120, it is determined whether or not the blower fan 46 is set to an auto blower mode. This determination is performed by judging, from the state of the operation unit 15, whether or not a blower switch for instructing that the blower fan 46 be set to either an automatic setting operating mode (auto blower mode) or a manual setting operating mode (manual blower mode) has been set to the auto blower mode. In a case where the determination is no, the air conditioning ECU 11 moves to step 114. In a case where the determination in step 120 is no, this corresponds to a state in which the occupant intends for the manual setting operating mode (manual blower mode) to be on, so in order to maintain the engine shutdown without shutting down the blower fan, the air conditioning ECU 11 maintains the engine shutdown (step 132) and repeats the above processing until the timer reaches the time TA (until the determination in step 114 becomes yes).

Thus, even when the occupant has intentionally given an instruction that the manual setting operating mode (manual blower mode) is to be on, engine startup is performed at the time TA, the transition from engine shutdown to engine startup can be made by the time odor and glass fogging occur in accordance with the outside air temperature, and the occurrence of odor and glass fogging can be prevented.

In a case where the determination in step 120 is yes, the air conditioning ECU 11 moves to step 122. In step 122, it is determined whether or not the outside air temperature is in a blower fan control target range. For this blower fan control target range, an outside air temperature upper limit value and lower limit value (the outside air temperatures P1 to P2 in FIG. 2) are set in such a way that the shutdown of the operation of the blower fan 46 is performed in the outside air temperature range that has little effect on the comfort of the cabin environment. In a case where the determination in step 122 is no, in order to maintain the engine shutdown without shutting down the blower fan, the air conditioning ECU 11 maintains the engine shutdown (step 132) and repeats the above processing until the timer reaches the time TA (until the determination in step 114 becomes yes).

Thus, in a case where the outside air temperature is outside the blower fan control target range, the air conditioning ECU 11 does not execute later-described blower fan operation control, so it can be suppressed from having an effect on the comfort of the cabin environment.

In a case where the determination in step 122 is yes, the air conditioning ECU 11 moves to step 124. In step 124, it is determined whether or not the timer (the eco-running time) activated in step 110 has reached the time TC. In a case where the determination in step 124 is no, the operation of the blower fan is continued, the engine shutdown is maintained (step 132), and the air conditioning ECU 11 repeats the above processing until the timer reaches the time TC (until the determination in step 124 becomes yes).

In a case where the determination in step 124 is yes, the air conditioning ECU 11 moves to step 126. In step 126, it is determined whether or not the timer (the eco-running time) has reached the time TB. In a case where the determination in step 126 is yes, the air conditioning ECU 11 moves to step 128, controls the blower fan 46 in such a way that the blower fan 46 shuts down, and then moves to step 132. On the other hand, in a case where the determination in step 126 is no, the air conditioning ECU 11 moves to step 130, controls the blower fan 46 in such a way that the blower fan 46 is operated, and thereafter outputs an engine startup request signal (step 116). That is, the operation of the blower fan is shut down, the engine shutdown is maintained (step 132), and the air conditioning ECU 11 repeats the above processing until the timer reaches the time TB (until the determination in step 126 becomes yes).

Thus, the shutdown of the operation of the blower fan 46 is performed in the outside air temperature range that has little effect on the comfort of the cabin environment. Because of this shutdown of the blower fan, the increase in the temperature of the evaporator is mitigated and the eco-runnable time found in accordance with the outside air temperature is extended from the time TA to the time TB (FIG. 3). Further, the air conditioning ECU 11 executes the blower fan operation control in the outside air temperature range that has little effect on the comfort of the cabin environment, so it can be suppressed from having an effect on the comfort of the cabin environment. In this way, the blower fan is shut down at the time TC and engine startup is performed at the time TB, so the transition from engine shutdown to engine startup can be made by the time odor and glass fogging occur in accordance with the outside air temperature, and the eco-runnable time (the time until engine startup) can be extended to save power while preventing the occurrence of odor and glass fogging and maintaining the comfort of the cabin environment.

In this way, in the present embodiment, in a case where the engine has been shut down by the eco-running ECU 17, the comfort of the cabin environment resulting from air conditioning can be continued by controlling the blower fan 46 in such a way that the blower fan 46 operates. Further, the shutdown of the blower fan 46 during the engine shutdown is performed in accordance with the outside air temperature at the time TC that is shorter by the predetermined fixed time from the eco-runnable time TA resulting from the continuation of the operation of the blower fan 46. Because of this shutdown of the operation of the blower fan 46, the increase in the temperature of the evaporator 20 is mitigated and the time until engine startup—that is, the time until the temperature of the evaporator 20 reaches the temperature at which there is the potential for odor and fogging to occur—is extended to the time TB. Consequently, the compressor 14 can be driven before odor occurs or glass fogs up while extending the time until engine startup and maintaining the comfort of the cabin environment, and odor and glass fogging caused by eco-running can be prevented. Further, the time until engine startup by eco-running can be extended, so power can be saved.

Incidentally, in areas where there are many traffic signals, such as urban areas, or regions where there are many stop signs, there are cases where the number of brief stops a vehicle makes at traffic lights and stop signs increases.

Figure 5:
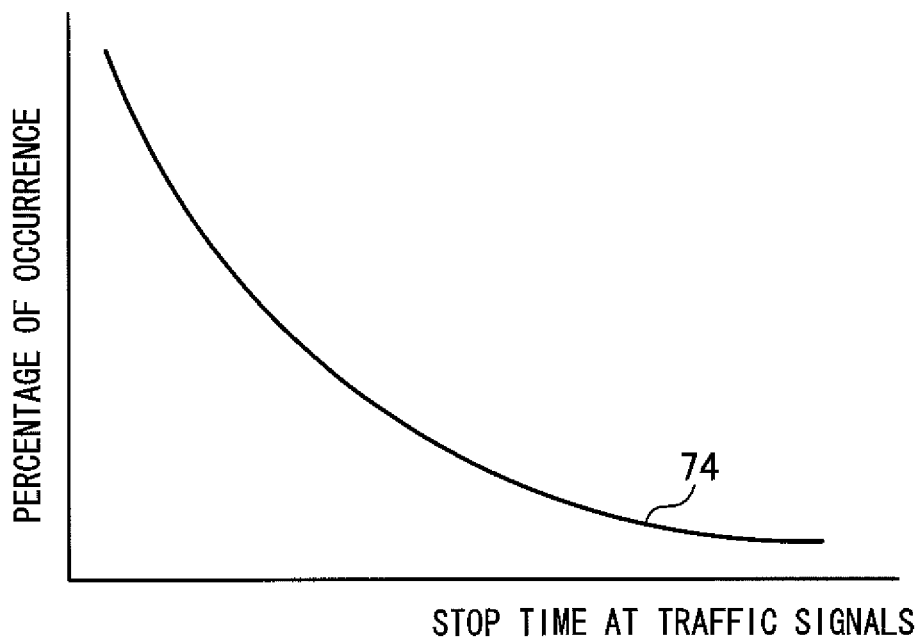
FIG. 5 is a characteristic diagram showing the relationship between percentage of occurrence and stop time at traffic signals in urban areas and so forth.

FIG. 5 is a characteristic diagram showing the relationship between percentage of occurrence and stop time at traffic signals in urban areas and so forth as an example. As shown in FIG. 5, the relationship between stop time and percentage of occurrence becomes a characteristic 74 in which the percentage of occurrence increases as the stop time becomes shorter. In the present embodiment, in a case where the stop time is short, the blower fan 46 continues operation until the time TA or the blower fan shutdown time TC that is determined in accordance with an outside air temperature in the predetermined outside air temperature range. Consequently, even if the vehicle repeatedly makes brief stops, the operation of the blower fan does not switch often. For this reason, the comfort of the cabin environment can be maintained.

Second Embodiment

Next, a vehicular air conditioning system pertaining to a second embodiment of the present invention will be described. The second embodiment makes it possible to set the time at which to shut down the blower fan 46. The second embodiment has substantially the same configuration as the first embodiment, so parts that are the same will be assigned the same reference signs and detailed description thereof will be omitted.

In the first embodiment, as the control that switches off the operation of the blower fan 46, the air conditioning ECU 11 shuts down the operation of the blower fan 46 between engine shutdown and the time (the eco-runnable time TA) until the engine is switched on when the operation of the blower fan 46 has been continued. This control that switches off the operation of the blower fan 46 is performed in such a way as to become shorter by the predetermined time from the eco-runnable time TA. Thus, the first embodiment has the advantages of both maintaining the comfort of the cabin environment by continuing the operation of the blower fan 46 from engine shutdown and saving power while extending the time until engine startup by eco-running by shutting down the operation of the blower fan 46 at the predetermined time. Consequently, depending on the time at which the operation of the blower fan 46 is continued from engine shutdown, this has an effect on the comfort of the cabin environment and saving power.

Therefore, regarding the incompatible functions of maintaining the comfort of the cabin environment and saving power that are dependent on the operating time of the blower fan 46, the present embodiment makes it possible to selectively instruct these functions by making it possible to set the time at which to shut down the blower fan 46.

Specifically, the vehicular air conditioning system 10 can be configured in such a way that selective instructions regarding the comfort of the cabin environment and saving power that have been instructed in stages by an operation using the operation unit 15 are set. For example, the vehicular air conditioning system 10 can be set in three stages: a comfort priority mode that gives priority to the comfort of the cabin environment, a balanced mode (the first embodiment) that balances the comfort of the cabin environment and saving power, and a power saving priority mode that gives priority to saving power. The settings are not limited to three stages.

That is, regarding the eco-running map shown in FIG. 2, the time TC at which to shut down the operation of the blower fan 46 is found by the off-characteristic 64 that becomes shorter by the fixed time from the correlation characteristic 60 in the outside air temperature range 62. Consequently, the comfort of the cabin environment improves as the off-characteristic 64 becomes closer to the correlation characteristic 60, and power saving improves as the off-characteristic 64 becomes farther away from the correlation characteristic 60.

Therefore, the comfort priority mode that gives priority to the comfort of the cabin environment sets a characteristic that becomes closer to the correlation characteristic 60 than the off-characteristic 64 that becomes shorter by the fixed time with respect to the correlation characteristic 60 of the above embodiment whose purpose is to balance the comfort of the cabin environment and saving power. Further, the power saving priority mode that gives priority to saving power is set to a characteristic that becomes farther away from the correlation characteristic 60 and also becomes farther away from the off-characteristic 64. Maps according to these settings are stored in the memory 29 as a comfort priority eco-running map and a power saving priority eco-running map.

In the power saving priority mode, power is saved the most by making the above-described fixed time a time that coincides with the eco-runnable time TA lasting from engine shutdown to engine startup when the operation of the blower fan 46 has been continued. That is, this is a case where the operation of the blower fan 46 is shut down at the time when the engine is shut down.

Figure 6:
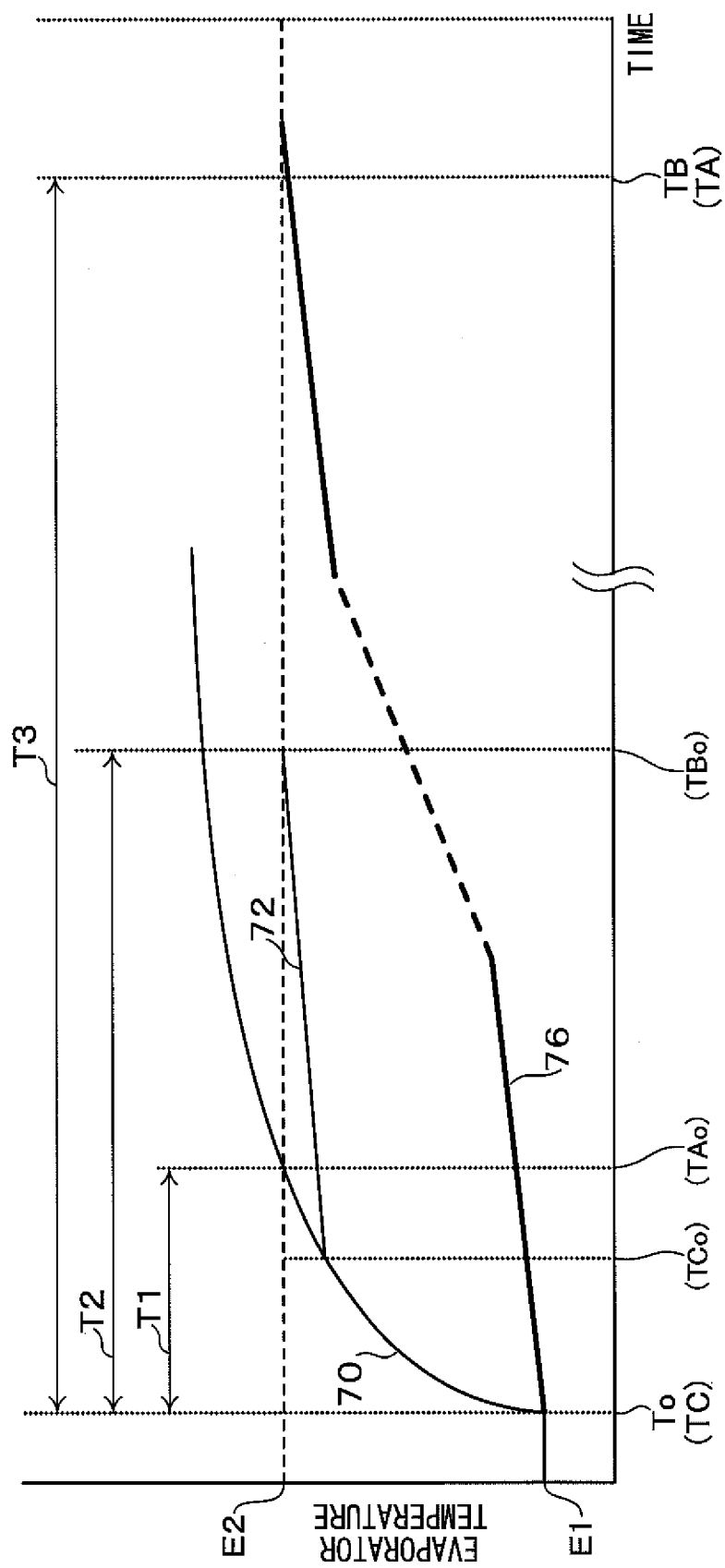
FIG. 6 is a diagram showing the temperature characteristic of the evaporator with respect to the elapse of time at the arbitrary outside air temperature in a power saving priority mode pertaining to a second embodiment of the present invention.

FIG. 6 shows the temperature characteristic of the evaporator 20 with respect to the elapse of time at the arbitrary outside air temperature Px in the power saving priority mode when power is saved the most. In FIG. 6, the times TA, TB, and TC shown in FIG. 3 are written as times TAo, TBo, and TCo.

As shown in FIG. 6, until the engine shutdown time To, the temperature of the evaporator 20 stays at the temperature E1 because of air conditioning control. At this time, the operation of the blower fan 46 is shut down at the time TC that is shorter by the fixed time coinciding with the time TA from the eco-runnable time TA—that is, the blower fan 46 is shut down at the time To. Because of this shutdown of the operation of the blower fan 46, the increase in the temperature of the evaporator 20 is mitigated and the temperature of the evaporator 20 becomes a characteristic 76 that is a linear increase. Thus, the time until the engine is switched on—that is, the time until the temperature of the evaporator 20 reaches the temperature E2 at which there is the potential for odor and fogging to occur—is extended to the time TB. Consequently, the time until the engine is switched on is extended from the eco-runnable times T1 and T2 resulting from the continuation of the operation of the blower fan 46 to an eco-runnable time T3.

Next, the action of the present embodiment will be described. In the present embodiment, in the processing of step 102 in FIG. 4, the air conditioning ECU 11 reads whether the setting resulting from an operation using the operation unit 15 has been set to a selective instruction regarding the comfort of the cabin environment and power saving (e.g., any of the comfort priority mode, the balanced mode (the first embodiment), and the power saving priority mode). Additionally, in step 102, the air conditioning ECU 11 calculates the times TA, TB, and TC corresponding to the acquired outside air temperature using the eco-running map stored beforehand in accordance with the instructed mode.

In this way, the present embodiment makes it possible to set the time at which to shut down the blower fan 46, such as, for example, making it possible to set a time according to a selective instruction regarding the comfort of the cabin environment and power saving, so in accordance with the intent of the user, the comfort of the cabin environment can be given priority, the comfort of the cabin environment and saving power can be balanced, or saving power can be given priority.

Third Embodiment

Next, a vehicular air conditioning system pertaining to a third embodiment of the present invention will be described. The third embodiment enables blowing force control in the operation of the blower fan. The third embodiment has substantially the same configuration as the first embodiment, so parts that are the same will be assigned the same reference signs and detailed description thereof will be omitted.

The present embodiment differs from the first embodiment in that, whereas in the first embodiment the air conditioning ECU 11 performed control to switch the operation of the blower fan 46 on and off, in the present embodiment blowing force control is added during the operation of the blower fan 46.

In the first embodiment, the air conditioning ECU 11 causes the operation of the blower fan 46 to continue from engine shutdown and shuts down the operation of the blower fan 46 after the predetermined time. In this way, by causing the operation of the blower fan 46 to continue from engine shutdown, the comfort of the cabin environment is maintained, and by shutting down the operation of the blower fan 46 at the predetermined time, the time until engine startup by eco-running is extended to save power.

Incidentally, regarding the operation of the blower fan 46, suppressing the blowing force of the blower fan 46 is effective for mitigating the increase in the temperature of the evaporator 20. That is, regarding the operation of the blower fan 46 after engine shutdown, suppressing the blowing force just before engine shutdown is effective.

Therefore, the present embodiment makes it possible to balance the comfort of the cabin environment and saving power by enabling a setting that suppresses the blowing force of the blower fan 46 in the operation of the blower fan 46 after engine shutdown. That is, in the present embodiment, a blowing force suppression value of the blower fan 46 with which it is possible to balance the comfort of the cabin environment and saving power is found beforehand experimentally or experientially, and the blowing force suppression value is stored in the memory 29. Additionally, when the blower fan 46 is operated after engine shutdown, the blower fan 46 is operated by the blowing force according to the blowing force suppression value.

The blowing force suppression value may be a predetermined value stored in the memory 29 or may be set by an operation using the operation unit 15. As an example of a blowing force suppression value set by an operation using the operation unit 15, one or more percentages (e.g., percentages of 0 to 100%) with respect to the maximum capacity of the blower fan 46 may be set.

Next, the action of the present embodiment will be described. In the present embodiment, in the processing of step 110 in FIG. 4, the predetermined blowing force suppression value or the blowing force suppression value set by an operation using the operation unit 15 is read, and the air conditioning ECU 11 initiates control in such a way that the blower fan 46 is operated by a blowing force suppressed in accordance with the blowing force suppression value. Further, when the air conditioning ECU 11 operates the blower fan 46 just before engine startup (step 130), the air conditioning ECU 11 releases the control resulting from the blowing force suppressed in accordance with the blowing force suppression value and initiates control in such a way that the blower fan 46 is operated by the blowing force just before the engine shutdown.

Figure 7:
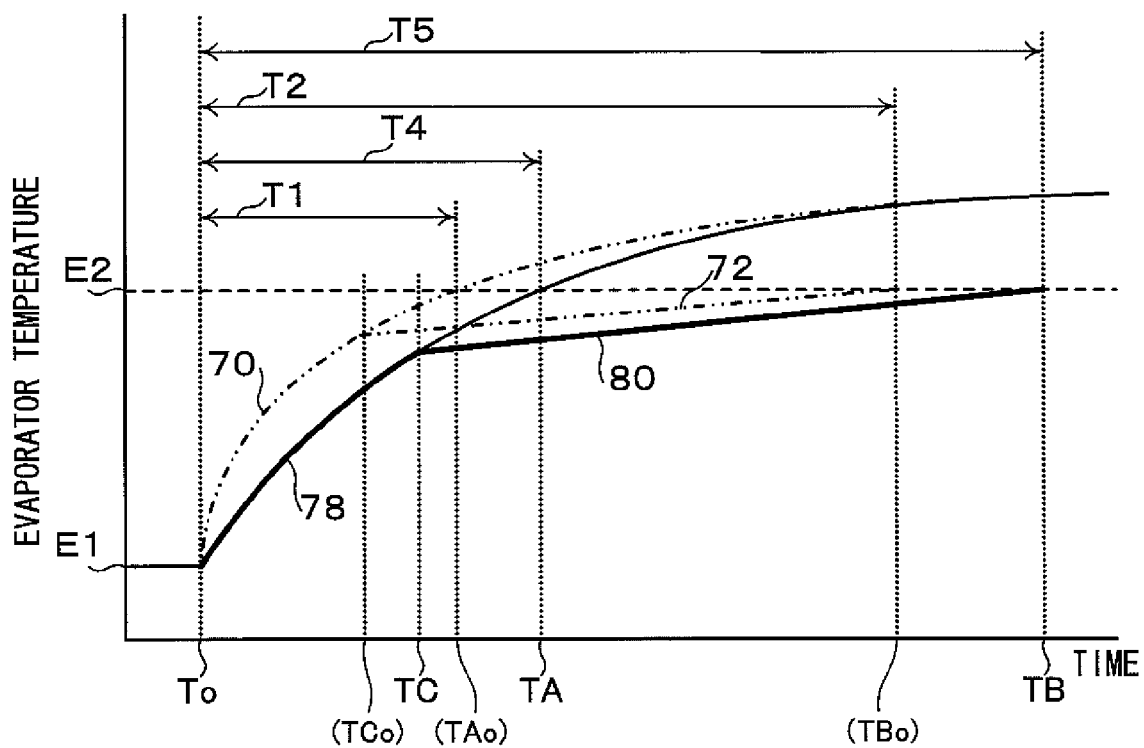
FIG. 7 is a diagram showing the temperature characteristic of the evaporator with respect to the elapse of time at the arbitrary outside air temperature during blower fan operation resulting from suppressed blowing force pertaining to a third embodiment of the present invention.

FIG. 7 shows the temperature characteristic of the evaporator 20 with respect to the elapse of time at the arbitrary outside air temperature Px in the outside air temperature range 62 including a case where the blower fan 46 is operated by a blowing force suppressed in accordance with the blowing force suppression value. In FIG. 7, the times TA, TB, and TC shown in FIG. 3 are written as times TAo, TBo, and TCo.

As shown in FIG. 7, until the engine shutdown time To, the temperature of the evaporator 20 stays at the temperature E1 because of air conditioning control. At the point in time of this time To, the operation of the blower fan 46 is initiated by the blowing force suppressed in accordance with the blowing force suppression value. Because of this suppressed blowing force, the temperature of the evaporator 20 becomes a characteristic 78 that is mitigated from the characteristic 70 and increases gradually from the temperature E1 because of engine shutdown. In this characteristic 78, the time TA at which the temperature of the evaporator 20 reaches the temperature E2 is extended more than the time TAo shown in FIG. 3 and is extended from the eco-runnable time T1 to t4.

Further, the time TC that is shorter by the predetermined fixed time from the eco-runnable time TA is also extended from the time TCo and the blower fan 46 is shut down. Because of this shutdown of the operation of the blower fan 46, the increase in the temperature of the evaporator 20 is mitigated and the temperature of the evaporator 20 becomes a characteristic 80 that is a linear increase. Thus, the time until the engine is switched on—that is, the time until the temperature of the evaporator 20 reaches the temperature E2 at which there is the potential for odor and fogging to occur—is extended from the time TBo to the time TB. Consequently, the time until the engine is switched on is extended from the eco-runnable time T2 resulting from the continuation of the operation of the blower fan 46 to an eco-runnable time T5.

In this way, the present embodiment makes it possible to suppress the blowing force in the operation of the blower fan 46 after engine shutdown, so the comfort of the cabin environment and saving power can be balanced.

Further, because the present embodiment makes it possible to suppress the blowing force in the operation of the blower fan 46, rapid fluctuations in the blowing force produced by the operation and shutdown of the blower fan 46 can be suppressed. In this way, the present embodiment can provide to the occupant a blowing force in stages including a suppressed blowing force and can provide air conditioning in which there is little discomfort to the occupant.

The processing performed by the air conditioning ECU 11 in each of the above embodiments was described as processing that the air conditioning ECU 11 in the form of hardware executes, but the processing may also take the form of a vehicular air conditioning control program executable by a computer. In this case, the vehicular air conditioning control program may be stored in various types of recording media such as a flexible disk, a CD-ROM, a CD-R, or a DVD and circulated.

Further, in each of the above embodiments, the air conditioning ECU 11 was configured to calculate eco-runnable times and so forth using eco-running maps, but the air conditioning ECU 11 is not limited to this and may also be configured to calculate the times from predetermined functions corresponding to the maps, for example.

Further, in each of the above embodiments, a vehicular air conditioning system using a mechanical compressor that operates using the engine as a drive source was described as an example, but a vehicular air conditioning system using a motor-driven compressor may also be applied. In the case of a motor-driven compressor, it becomes possible to balance conserving electricity and preventing glass fogging by performing control such as issuing requests to switch the motor-driven compressor on and off, instead of the engine startup and shutdown requests in each of the above embodiments, in a case where the motor-driven compressor is to be shut down for the purpose of conserving battery power or the like.

Further, in each of the above embodiments, an example where the vehicular air conditioning system is equipped with the mode switching damper motor 24, the outlet switching damper motor 34, and the air mix damper motor 36 and automatically performs mode switching, outlet switching, and temperature regulation was described, but a vehicular air conditioning system from which these are omitted and in which the various types of switching are manually performed may also be applied. Moreover, a vehicular air conditioning system from which the solar radiation sensor and the inside air temperature sensor 30 are omitted and in which temperature regulation is manually performed may also be applied.

10 Vehicular Air Conditioning System
11 Air Conditioning ECU
12 Engine ECU
14 Compressor
17 Eco-running ECU
20 Evaporator
29 Memory
32 Outside Air Temperature Sensor

The invention claimed is:

1. A vehicular air conditioning control device comprising:
an acquiring component that acquires a detection result of a detecting component that detects an outside air temperature;
a calculating component that calculates, from the acquisition result of the acquiring component, a predetermined time corresponding to the outside air temperature which becomes longer as the outside air temperature becomes higher, a blower fan operating time lasting from engine shutdown until a blower fan is shutdown when a cabin interior is being air-conditioned by an air conditioning component equipped with an evaporator, with the blower fan, and with a compressor that operates using an engine as a drive source and compresses refrigerant, wherein the blower fan blows air toward the evaporator; and a control component that controls the blower fan in such a way that the blower fan shuts down when the blower fan operating time calculated by the calculating component has elapsed after the engine has been shut down by an engine control component that controls engine startup and shutdown in accordance with the driving state of the vehicle when the cabin interior is being air-conditioned by the air conditioning component, wherein the control component further controls the blower fan in such a way that the blower fan operates until a time when a sensing result of a sensing component that senses a temperature of the evaporator becomes a dew point temperature corresponding to the outside air temperature.

2. The vehicular air conditioning control device according to claim 1, wherein the calculating component calculates the blower fan operating time corresponding to the detection result of the detecting component from a map in which the blower fan shutdown time is predetermined in accordance with the outside air temperature.

3. The vehicular air conditioning control device according to claim 1, wherein the control component controls the operation of the blower fan in such a way that the blowing force of the blower fan is suppressed during the blower fan operating time lasting from engine shutdown until the blower fan is shutdown.

4. The vehicular air conditioning control device according to claim 1, wherein the control component controls the blower fan in such a way that the blower fan shuts down when the outside air temperature is in a predetermined outside air temperature range.

5. The vehicular air conditioning control device according to claim 1, wherein the calculating component calculates the engine shutdown time lasting from engine shutdown until the temperature around the evaporator reaches the dew point temperature on the basis of the outside air temperature and the blower fan operating time, and the control component controls the engine control component in such a way as to start up the engine in a case where the engine shutdown time calculated by the calculating component has elapsed.

6. The vehicular air conditioning control device according to claim 1, wherein the control component uses, as the sensing result of the sensing component, an estimated temperature of the evaporator estimated from at least one of a rate of temperature increase and a temperature characteristic of the evaporator found beforehand on the basis of the outside air temperature and the blower fan operating time.

7. The vehicular air conditioning control device according to claim 6, wherein the control component calculates the blower fan operating time in such a way that it becomes a time shorter by a predetermined time than an engine shutdown time lasting from engine shutdown until the temperature around the evaporator reaches the dew point temperature.

8. A vehicular air conditioning control method comprising:

an acquisition step of acquiring a detection result of a detecting component that detects an outside air temperature;

a calculation step of calculating, from the acquisition result of the acquisition step, a predetermined time corresponding to the outside air temperature which becomes longer as the outside air temperature becomes higher, a blower fan operating time lasting from engine shutdown until a blower fan is shutdown when a cabin interior is being air-conditioned by an air conditioning component equipped with an evaporator, the blower fan, and a compressor, that operates using an engine as a drive source and compresses refrigerant, wherein the blower fan blows air toward the evaporator; and a control step of controlling the blower fan in such a way that the blower fan shuts down when the blower fan operating time calculated by the calculation step has elapsed after the engine has been shut down by an engine control component that controls engine startup and shutdown in accordance with the driving state of the vehicle when the cabin interior is being air-conditioned by the air conditioning component, the control step further comprising controlling the blower fan in such a way that the blower fan operates until a time when a sensing result of a sensing component that senses a temperature of the evaporator becomes a dew point temperature corresponding to the outside air temperature.

9. A non-transitory recording medium in which a vehicular air conditioning control program for causing a computer to function as each of the components of the vehicular air conditioning control device according to claim 1 is recorded.

* * * * *